United States Patent
Carlsson

(10) Patent No.: US 7,184,425 B2
(45) Date of Patent: Feb. 27, 2007

(54) ENHANCED MOBILE STATION POSITIONING IN A WIRELESS COMMUNICATION NETWORK

(75) Inventor: Hans Carlsson, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 923 days.

(21) Appl. No.: 10/085,399

(22) Filed: Feb. 28, 2002

(65) Prior Publication Data

US 2003/0162549 A1    Aug. 28, 2003

(51) Int. Cl.
*H04L 5/22* (2006.01)
(52) U.S. Cl. .................. 370/345; 370/347
(58) Field of Classification Search ........ 370/280; 342/357.06, 357.03, 357.12; 455/434
See application file for complete search history.

(56) References Cited

U.S. PATENT DOCUMENTS 6,201,966 B1 * 3/2001 Rinne et al. ............... 455/434
6,313,787 B1 * 11/2001 King et al. ............. 342/357.03

FOREIGN PATENT DOCUMENTS

| EP | 0892571 | 1/1999 |
|---|---|---|
| EP | 0954189 | 11/1999 |

OTHER PUBLICATIONS

TDMA Third Generation Wireless—System Assisted Mobile Positioning Through Satellite (SAMPS) Teleservices, ANSI/TIA/EIA-136-740-2001 Approved: Apr. 23, 2001.*
3GPP TS 45.002 V5.3.0; Nov. 2001; pp. 8-40, 62, 67-69.
3GPP TS 43.059 V.5.1.0; Nov. 2001; pp. 8-30; 49-56.
3GPP TS 44.031 V5.0.0; Sep. 2001; pp. 2-58.
3GPP TS 44.060 V4.3.0; Sep. 2001; pp. 18-39; 59-115.

* cited by examiner

*Primary Examiner*—Hassan Kizou
*Assistant Examiner*—Salman Ahmed
(74) *Attorney, Agent, or Firm*—Michael D. Murphy

(57) ABSTRACT

An approach to facilitating positioning operations or other designated tasks performed by mobile stations within a wireless communication network enables individual mobile stations to request "free" or idle time if the mobile station's current operations do not provide sufficient background time to perform the required task. For example, the mobile station might be commanded to perform a positioning computation within a required time limit. If its background processing time is insufficient, the mobile station requests additional idle time from the network, which, if allocated by the network, is used by the mobile station to complete the required processing task. In an exemplary application, a GPRS-based network allocates additional "idle" blocks into the time-multiplexed multiframe structures supporting packet data communications with the mobile station. Here, the mobile station indicates the idle time needed, and the network determines how best to distribute the required idle blocks over one or more forthcoming multiframes.

19 Claims, 7 Drawing Sheets

ENHANCED MOBILE STATION POSITIONING IN A WIRELESS COMMUNICATION NETWORK

BACKGROUND OF THE INVENTION

The present invention generally applies to wireless communication systems, and particularly applies to allocating time to mobile stations for the performance of processing tasks at the mobile stations.

As mobile communication devices continue their move toward complete integration into the framework of our daily lives, their range of uses continues expanding. For example, location-based services represent one area of rapidly increasing activity. In its broadest sense, the notion of location-dependent services entails tracking or otherwise identifying the locations of one or more users, perhaps at specific times, and making location-specific information available to them.

Such services might operate as "push" facilities where information is automatically delivered to a user's mobile communication device upon entering a given geographic zone or area, or might operate as "pull" services where the user solicits location-specific information from the supporting network. In either instance, the user generally gives prior approval for the use of his or her mobile communication device in location-based services. Emergency services location operations generally represent an exception to this prior approval scheme.

In any case, a given wireless communication network might offer a range of different location-based services, perhaps available based on varying subscription costs. Further flexibility is gained by giving third-party location services providers controlled access to the wireless communication network. In this manner, entities other than the network service provider can offer network subscribers selected location-based services, often doing so based on formal agreements between the third-party provider, the network operator, and the individual subscribers.

Effective, accurate, and timely location measurement entails overcoming many challenges. Different types of wireless networks use differing mobile positioning schemes. Positioning schemes range from the relatively course approach wherein a mobile's position is reported only to the "serving cell," to more sophisticated approaches based on Global Positioning System (GPS) information, which can yield mobile station position accuracy on the order of ten meters. Even without GPS, wireless networks using time-of-arrival techniques provide measurement accuracies of one hundred meters or less.

In general, the various wireless network implementations each support several approaches to mobile station positioning. For example, the technical specification TS 43.059 specifies standard LoCation Services (LCS) methods for networks based on the GSM-EDGE Radio Access Network (GERAN) standards, where GSM represents Global System for Mobile Communication, and EDGE represents Enhanced Data Rates through Global Evolution. As those skilled in the art will recognize, EDGE specifies relatively sophisticated modulation techniques that may be used for higher data rate communication within the radio frequency spectrum allocated for GSM systems. GERAN systems can employ cell coverage based positioning methods, Enhanced Observed Time Difference (E-OTD) positioning methods, and/or GPS based positioning methods.

Similarly, the developing standards falling under the umbrella of Universal Terrestrial Radio Access Network (UTRAN) allow for various positioning approaches. The technical specification TS 25.305 UTRAN Stage 2 identifies supported locating methods as including cell coverage based positioning methods, Observed Time Difference of Arrival (OTDOA) positioning methods, and GPS based positioning methods.

Common to many of these schemes, and true across these and other network types, most positioning approaches depend on the individual mobile stations to support at least some of the position-related operations necessary to locate the mobile station to the desired accuracy within the wireless network. That is, most positioning approaches require the mobile station to perform at least some of the measurements and/or computations associated with location determination.

This reliance on the mobile station taxes its ability to, in some cases, compute and provide timely position-related information. For example, General Packet Radio Service (GPRS) in GERAN provides relatively high-speed packet data services to GPRS-capable mobile stations. The maximum data rate depends on a number of parameters, including the capabilities of the mobile station itself. In general, however, the higher the data rate, the less "free" time available to the mobile station. That is, under packet data service operation, the mobile station's time is increasingly dedicated to transmit and/or receive operations with increasing data rate.

Indeed, operating scenarios within the context of GPRS and other network types can arise where the mobile station is engaged in data communication services to the extent that it lacks enough free processing time to perform required position-related operations. Ideally, the wireless communication network would include provisions that, where appropriate, allocate the time needed by the mobile station for position-related operations without disrupting ongoing communication.

BRIEF SUMMARY OF THE INVENTION

The present invention provides a method and apparatus permitting a mobile station engaged in active communication or otherwise operating in a mode with insufficient background or idle time to request additional idle time to perform required processing tasks, such positioning operations as in support of LoCation Services (LCS) within a wireless communication network. While the idea is applicable to a variety of wireless communication network types, application of the present invention to General Packet Radio Services (GPRS) networks represents an exemplary use.

While LCS implementations vary across network types and by equipment vendor, such operations commonly require mobile stations to perform at least a portion of the required positioning operations. In certain modes of operation, while engaged in high data rate communication, for example, there may be insufficient background processing time available at the mobile station to perform a designated task, such as a required positioning operation, within a defined time limit. Under these circumstances, the mobile station requests additional "idle" or free time from the supporting network, which, if granted by the network, allows the mobile station to timely complete the desired positioning operations by performing the needed processing during the forthcoming times designated by the network as idle time responsive to the request from the mobile station.

In one embodiment applicable to GPRS networks, mobile stations operating in packet data mode request additional "idle" blocks or frames from the network, if required to perform a positioning operation more quickly than the default number of idle frames permits. That is, a given mobile station might receive a request indicating a desired positioning operation and the desired time for completing that operation, and then determine that the amount of background processing time currently available to it is insufficient. If so, the mobile station transmits a request for the number of idle frames it needs to timely complete the positioning operation.

Upon receiving this request, the network determines whether, for example, its ongoing user scheduling operations will permit it to honor the request for additional idle time. If not, the network sends a response message indicating denial of the request. In that instance, the mobile station might respond with an error message indicating that it cannot perform the requested positioning operation within the desired time.

If the request is granted, the network generally determines the specific allocation of additional idle time. That is, the network determines how best to allocate additional idle frames in one or more forthcoming TDMA frames, such that the mobile station receives the requested amount of additional idle time. By interleaving the additional idle time into subsequent sets of active TDMA frames, the network enables the mobile station to perform the requested positioning operation without disrupting ongoing communication.

DETAILED DESCRIPTION OF THE INVENTION

While various embodiments of the present invention find applicability across a range of wireless communication network types, many of the following exemplary details focus on GPRS networks because that focus gives a clear context to the examples. However, it should be understood that the techniques described herein are not limited to application within GPRS networks.

Figure 1:
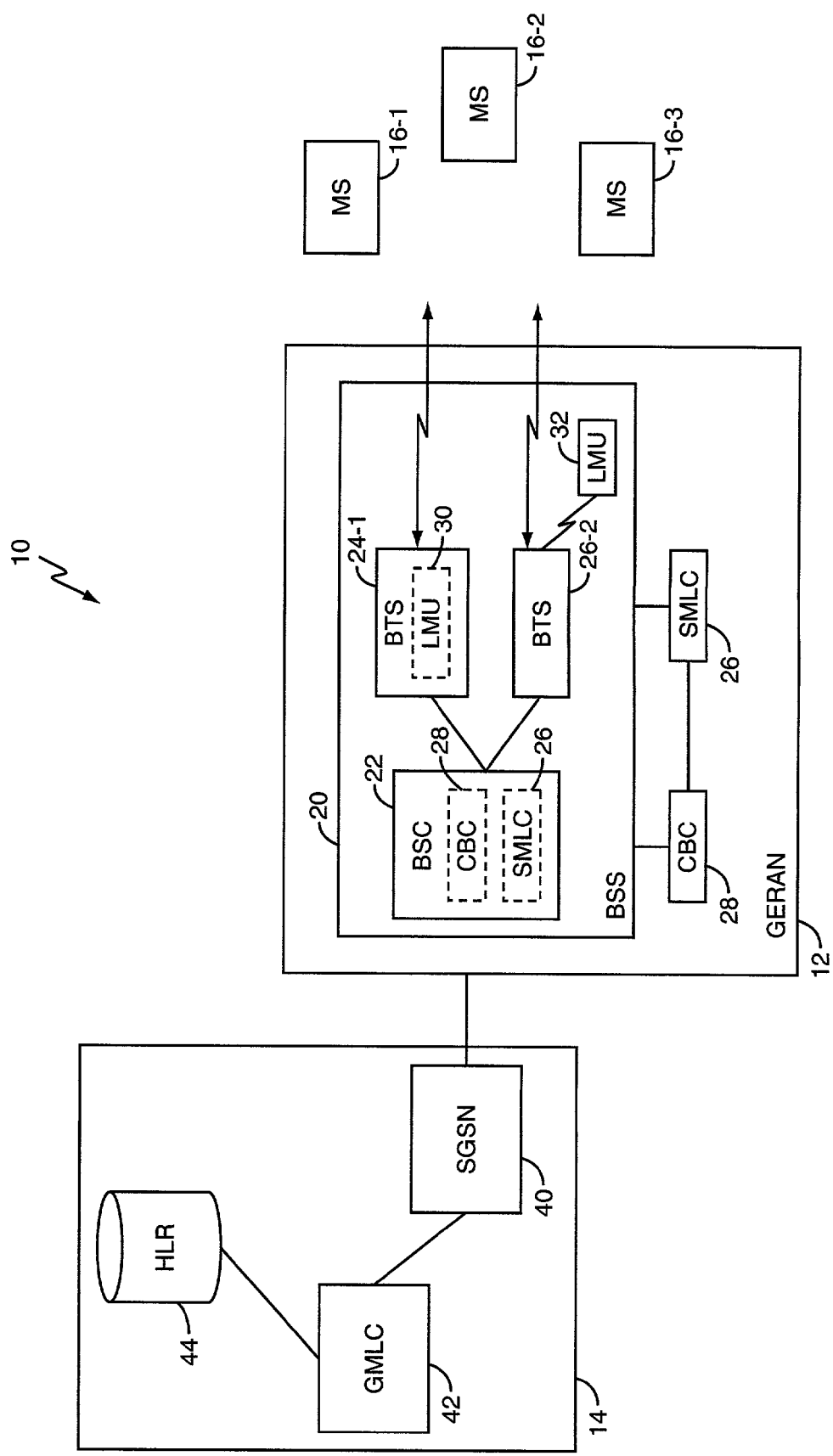
FIG. 1 is a diagram of an exemplary GPRS/GSM wireless communication network in accordance with the present invention.

With the above comments in mind, FIG. 1 illustrates an exemplary but simplified wireless communication network 10, configured here as a GPRS network. The exemplary network 10 comprises a radio access network (RAN) 12 communicatively linked with a core network (CN) 14. In this exemplary embodiment, the RAN 12 is configured as a GSM EDGE Radio Access Network, or GERAN, and provides communication support for a plurality of mobile stations 16, with only three shown (16-1 through 16-3) for simplicity. At least one of the mobile stations 16 operates as a GPRS terminal, and thus supports packet data communication in accordance with GPRS-based packet services.

Here, the RAN 12 includes systems supporting communication and location services functions (LCS functions). More specifically, the RAN 12 comprises a base station system (BSS) 20, including a base station controller (BSC) 22 and one or more base station transceivers (BTSs) 24. The BSC 20 may include LCS systems, such as a serving mobile location center (SMLC) 26, and a cell broadcast center (CBC) 28. Alternatively, the SMLC 26 and CBC 28 are affiliated with the BSS 20, but not necessarily included within the BSC 22, which configuration also is shown in the diagram. RAN 12 may further include one or more location measurement units (LMUs), here LMUs 30 and 32. As suggested by the nomenclature, the LMUs 30 and 32 support LCS operations (positioning operations) by performing certain measurements and computations.

The CN 14 comprises a serving GPRS support node (SGSN) 40, a gateway mobile location center (GMLC) 42, and a home location register (HLR) 44. In general terms, the SGSN 40 includes functionality supporting mobile station subscription authorization, and managing positioning requests associated with LCS. Typically, the LCS functions of the SGSN 40 relate to charging and billing, LCS co-ordination, location request, authorization and operation of the LCS services within the network 10.

The GMLC 42 includes functionality supporting LCS, and it should be understood that, as with the other network entities depicted, there might be more than one GMLC within the network 10. In any case, the GMLC 42 is the first node accessed by an external LCS client, e.g., a third-party service providing offering network subscribers one or more LCS-based services. In support of LCS operations, the GMLC 42 may request routing information from the HLR 44, and after performing registration authorization, it sends positioning requests to various other network entities, such as the SGSN 40, or a mobile switching center (MSC) not shown. Generally, regardless of the particular arrangement involved, the GMLC 42 receives final location estimates from the corresponding entity or entities.

Finally, the HLR 44 generally includes LCS subscription data and routing information for the various subscribers supported by the network 10, e.g., the users of mobile stations 16. Under roaming conditions, one of the mobile stations 16 might be a visitor to network 10, and its corresponding HLR might be located in another wireless network, e.g., in another public land mobile network (PLMN).

Regardless of network type, i.e., GPRS, IS-136 TDMA, etc., LCS involves a wide range of operations, and depends on varying implementation details, but in general LCS involves determining on demand the location of one or more mobile stations 16 operating within the service area of network 10. Apart from the obvious benefit for facilitating emergency assistance to subscribers, the ability to locate mobile stations 16 allows the network service provider and various third-party providers to offer a range of location-based services.

For example, third-party service providers might interface with the network 10 to provide location-based advertising to network subscribers. That is, a subscriber nearby a given business might receive notification of an on-going sale on his or her mobile station 16. Further, a given subscriber might pay a service premium to receive location-sensitive local information, such as information on the nearest gas station, the nearest Italian restaurant, etc. In this context, the network 10 receives a request from an external system (i.e., a third-party service provider) to report the current location of a particular mobile station 16.

While these commercial location applications vary, individual subscribers generally contract in advance either through the network service provider, or the appropriate third-party provider for such services. That is, the network 10 generally will not provide LCS-based advertising or notifications to subscribers that have not explicitly indicated a desire to receive such services. Of course, even subscribers that do not participate in the commercial side of LCS benefit from it in terms of emergency location support, and in terms of the role played by LCS in network operations, such as location assisted handoff between BTSs 24.

In exemplary instances, the CN 14 requests a location estimate of a target mobile station 16, i.e., requests a location estimate for a specific one of the active mobile stations 16. In general, the location request contains sufficient information to enable location of the target mobile station 16 in accordance with any required quality of service (QoS) constraints based on any positioning method supported by the network 10. As an example, the CN 14 might request the current geographic coordinates of the target mobile station 16.

As was noted earlier, the network 10 might employ any one or several different LCS technologies, each offering differing complexity, network overhead, and location accuracy. Approaches to mobile station positioning include GPS, E-OTD and other variations on signal time-of-arrival observations. While these various approaches offer differing degrees of accuracy, i.e., positioning resolution, each requires a certain level of processing or computational support from the target mobile station 16.

For example, with E-OTD, the target mobile station 16 might measure the timing differences between multiple BTSs 24. For example, knowing the delays between three or more neighboring BTSs 24 relative to the target mobile station 16 permits relatively accurate (sub 100 meter) positioning of the target mobile station 16. Thus, in this scenario, the CN 14 generates a location request, which is transmitted to the target mobile station 16 by the RAN 14. Generally, the request identifies the desired or needed positioning operation to be performed by the target mobile station 16, and further identifies the desired time for responding to the positioning request. As an example in the GPRS context, the network 10 sends a "RRLP Measure Position Request" message to the target mobile station 16, where RRLP represents Radio Resource LCS Protocol, which is covered extensively in the 3$^{rd}$ Generation Partnership Project (3GPP) technical specification 3GPP TS 44.031 V5.1.0, entitled "Radio Resource LCS Protocol," and released on 2001 December.

Thus, the target mobile station 16 generally receives a positioning request that indicates to the mobile station 16 the needed positioning operation and a defined time for performing that operation. This information allows the mobile station 16 to determine whether its current operating mode provides sufficient background or idle processing time to perform the needed positioning operation within the defined time.

Figure 2:
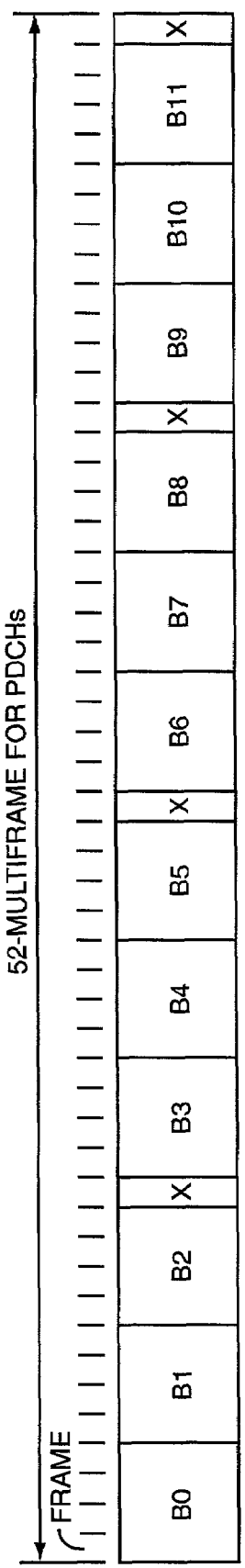
FIG. 2 is a diagram of the 52-multiframe structure defining the repeating TDMA frames used in packet data communication between a mobile station and wireless networks in GPRS.

To better understand how operating mode influences available background processing time, FIG. 2 illustrates the TDMA frame structure used by mobile stations 16 engaged in packet data calls with the network 10. That is, FIG. 2 illustrates the frame structure of the packet data channel (PDCH) defined for packet data communications within GPRS networks. GPRS multiplexes several users onto the same receive and transmit (RX/TX) frequency pair by organizing the radio resources in accordance with a TDMA scheme defining a repeating multiframe structure.

Figure 3:
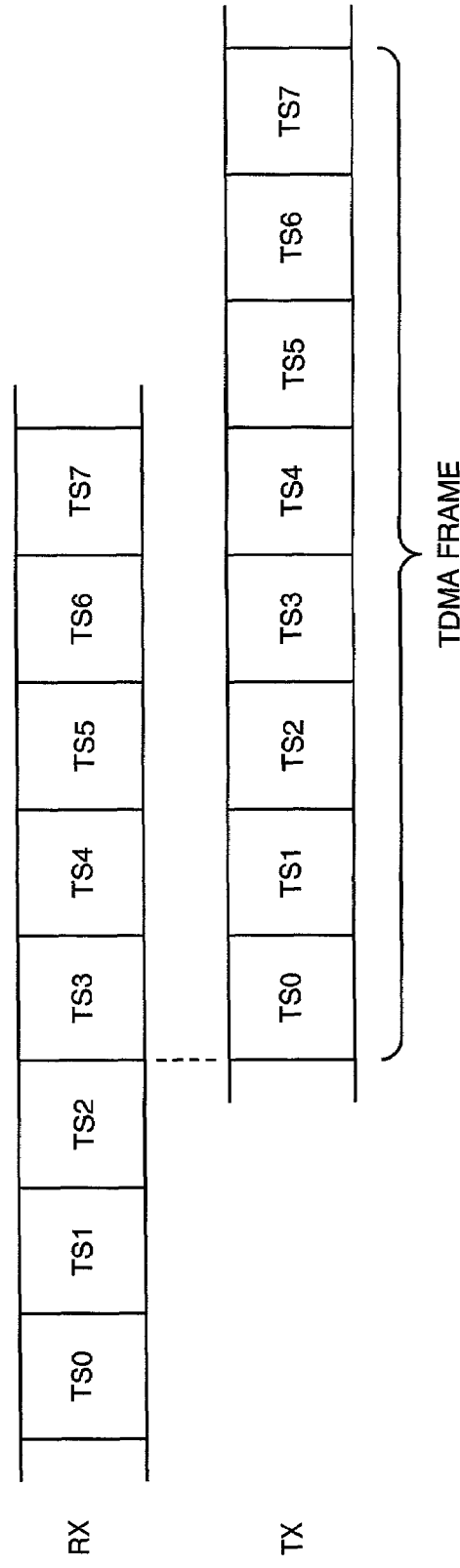
FIG. 3 is a diagram of exemplary receive (RX) and transmit (TX) TDMA timeslot/frame structures used in TDMA-based wireless communication.

Specifically, packet data communications use a 52-multiframe structure comprising twelve radio blocks (B0–B11), with one idle frame interposed between groups of three radio blocks for a total of four idle frames per 52-multiframe. FIG. 3 illustrates the structure of receive and transmit frames. One frame comprises eight time slots, TS0 through TS7. Generally, a portion of TS0 on one channel in each cell is used as the synchronization channel, SCH. Thus, each 52-multiframe comprises 52 frames, with eight time slots per frame. Each user, i.e., a specific one of the mobile stations 16, is assigned one or more receive (RX) time slots and one or more corresponding transmit (TX) time slots. For example, if a user is assigned RX time slot three, which is illustrated in the diagram, that same user is usually assigned TX time slot three.

As noted from the diagram, the TX time slots may be shifted relative to the RX time slots to avoid mobile stations 16 having to simultaneously receive and transmit. That is, the RX and TX time slots are shifted relative to one another so like numbered RX and TX time slots are not coincident in time.

Understanding the time slot/multiframe structure in the context of GPRS-based packet data communication leads to an understanding of the limits on available background processing time at the mobile stations 16. For example, certain types of mobile stations 16 achieve higher packet data rates by using more time slots per frame. Such mobile stations are referred to as "multislot class" terminals, meaning that terminals of that type have the capability to receive and transmit on a greater number of time slots within the repeating TDMA frames.

Essentially, the mobile stations 16 have only limited background or idle processing time. Here, background processing or idle time refers to the intermittent periods between active radio reception or transmission processing, and the processing directly attendant to those tasks. Generally, in the context of GPRS, background processing opportunities arise between receive (RX) and transmit (TX) bursts, and during the idle frames within the repeating 52-multiframe structures. Such limited background processing time might prevent a target mobile station 16 from performing a requested positioning operation within the indicated time limits.

An exemplary approach to gaining additional, temporary background or idle processing time allows the target mobile station 16 to determine how much additional idle time it needs to perform the needed positioning operation, and then request that additional idle time from the network 10. If the network 10 grants the request, it communicates back to the target mobile station 16 the specific times within the forthcoming TDMA frames that the target mobile station 16 should use for processing associated with the needed positioning operation.

Effectively, the network 10 must determine, if it grants the request, how best to interleave idle time with active communication time, and must insure that it does not attempt to use the time granted for communication activities as regards the requesting mobile station 16. That is, if the network 10 indicates that certain future times, e.g., time slots or frames, will be idle as regards the requesting mobile station 16, it must observe that restriction to avoid scheduling data transmission/reception to or from that mobile station 16 during those times.

In general terms, the target mobile station 16 determines how much processing time is required to complete the requested positioning operation and, if currently available background processing time is insufficient, requests additional idle time from the network. It may frame this request in terms of cumulative time required to perform the needed positioning operations, or the target mobile station 16 might express the needed time in terms of pre-defined time units. With this latter approach, the target mobile station 16 might, in exemplary embodiments, construct its request in terms of the number of additional idle frames needed to complete the requested positioning operation.

Figure 4:
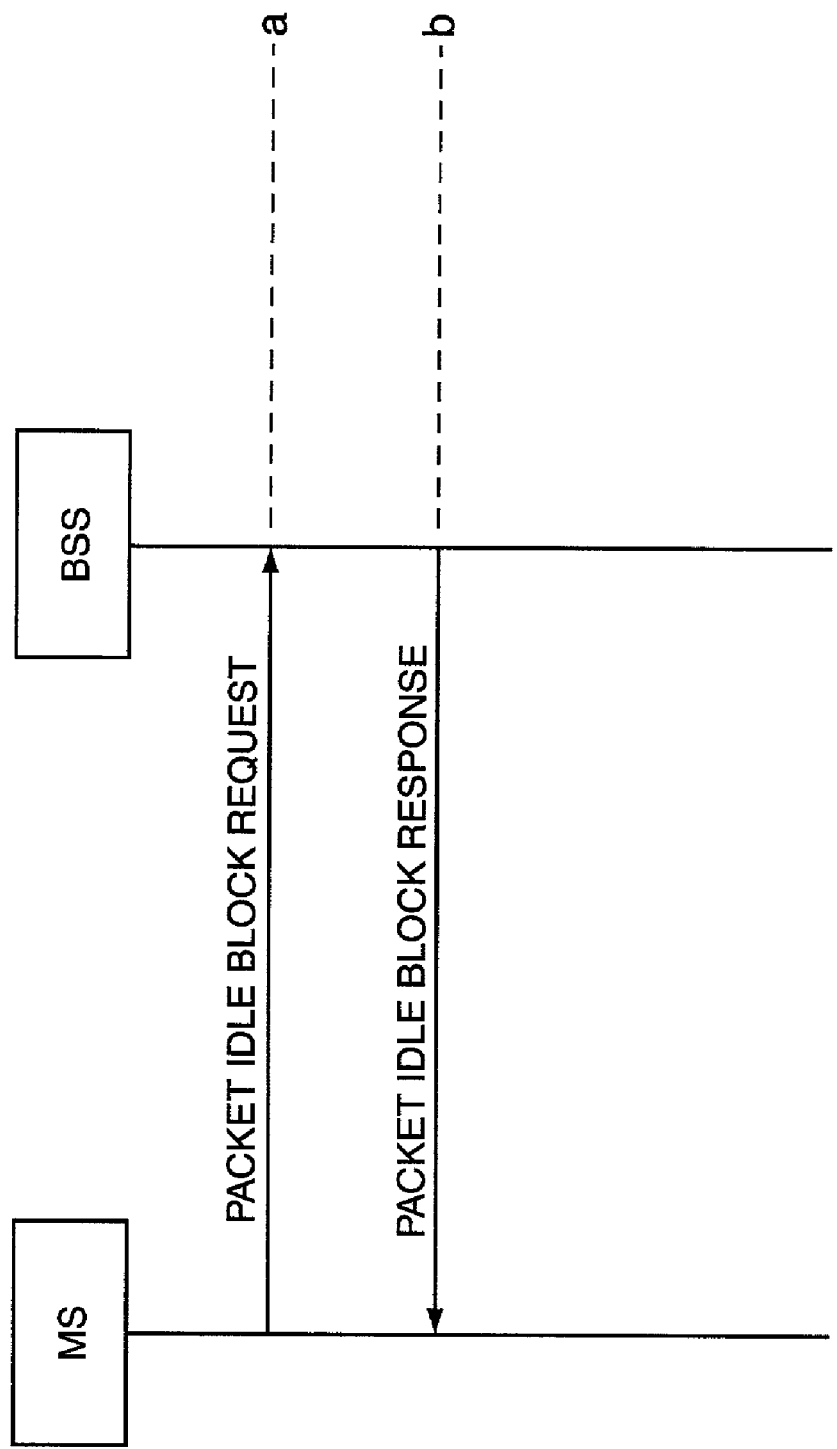
FIG. 4 is a diagram of an exemplary request/response signal flow diagram illustrating the request for and allocation of additional idle processing time for a mobile station.

FIG. 4 illustrates an exemplary approach in simplified terms, and in the context of GPRS. The target mobile station 16 recognizes that it needs more idle time to complete a requested positioning operation within the required time. Thus, it forms a "Packet Idle Block Request" message, which might include, but is not limited to, the following items: a temporary logical link identifier (TLLI) which identifies the mobile station 16 on a temporary basis and which values allows the message to be sent during discontinuous reception mode (DRX); the total number of idle frames required; and the number of 52-multiframes over which the mobile station 16 desires the requested idle frames to be distributed.

Upon receiving the request from the target mobile station 16, the network 10 generates a "Packet Idle Block Response" message, which it transmits to the requesting mobile station 16. An exemplary response message might include, but is not limited to the following items: the TLLI; a result indicator (i.e., request granted or denied); the number of forthcoming 52-multiframes over which the requested idle block grant will remain valid; a listing of the idle blocks (or frames) within the identified 52-multiframes which are designated as additional idle time. For example, the network 10 might provide a listing from the defined radio blocks B0–B11 that are granted as idle blocks in the specified number of forthcoming 52-multiframes. That is, the response message can indicate which radio blocks are temporarily re-designated as idle blocks for use by the requesting mobile station 16.

Figure 5A:
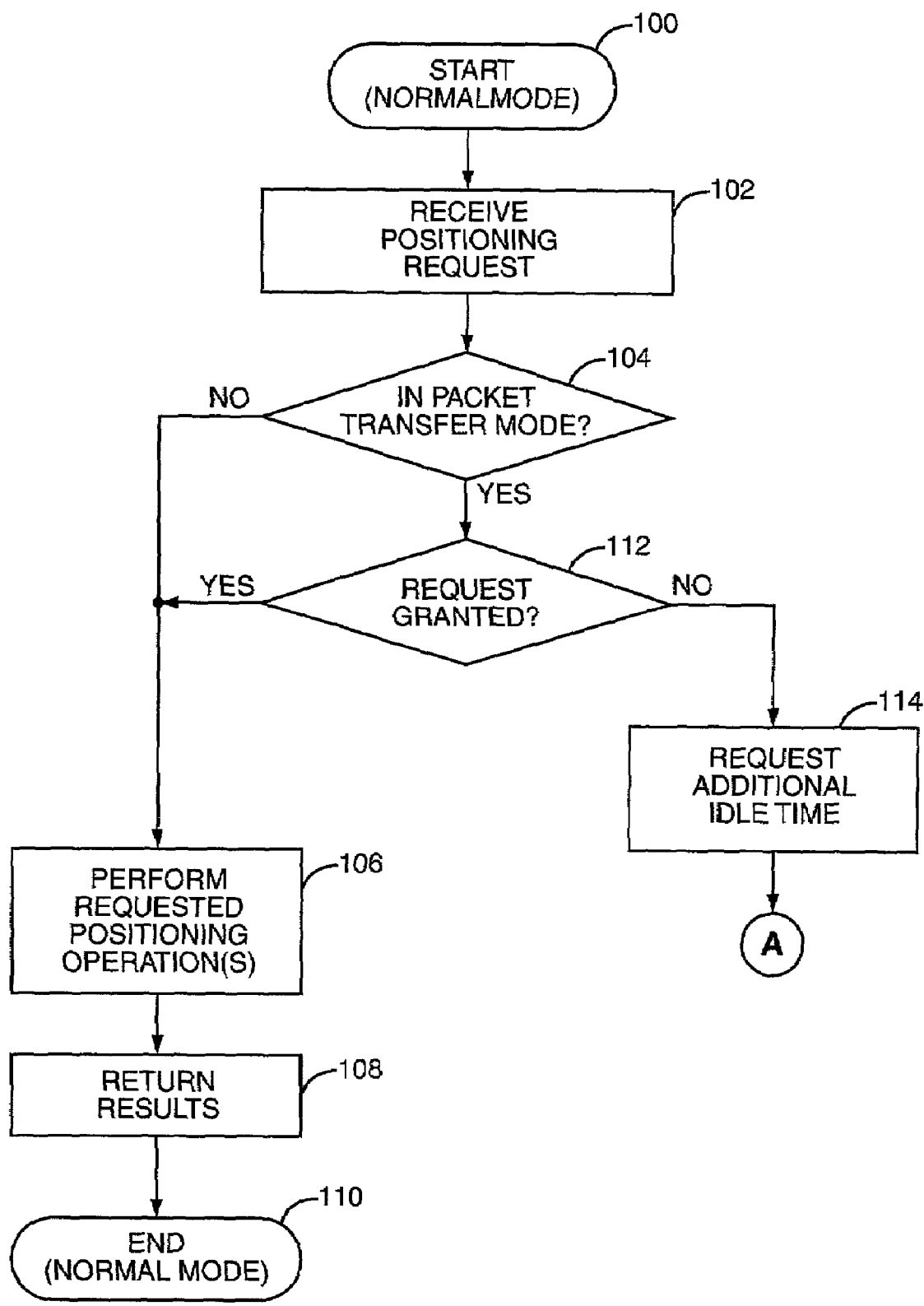
FIGS. 5A and 5B are exemplary logic flow diagrams illustrating the request for and response to the grant of additional idle processing time at a mobile station.
Figure 5B:
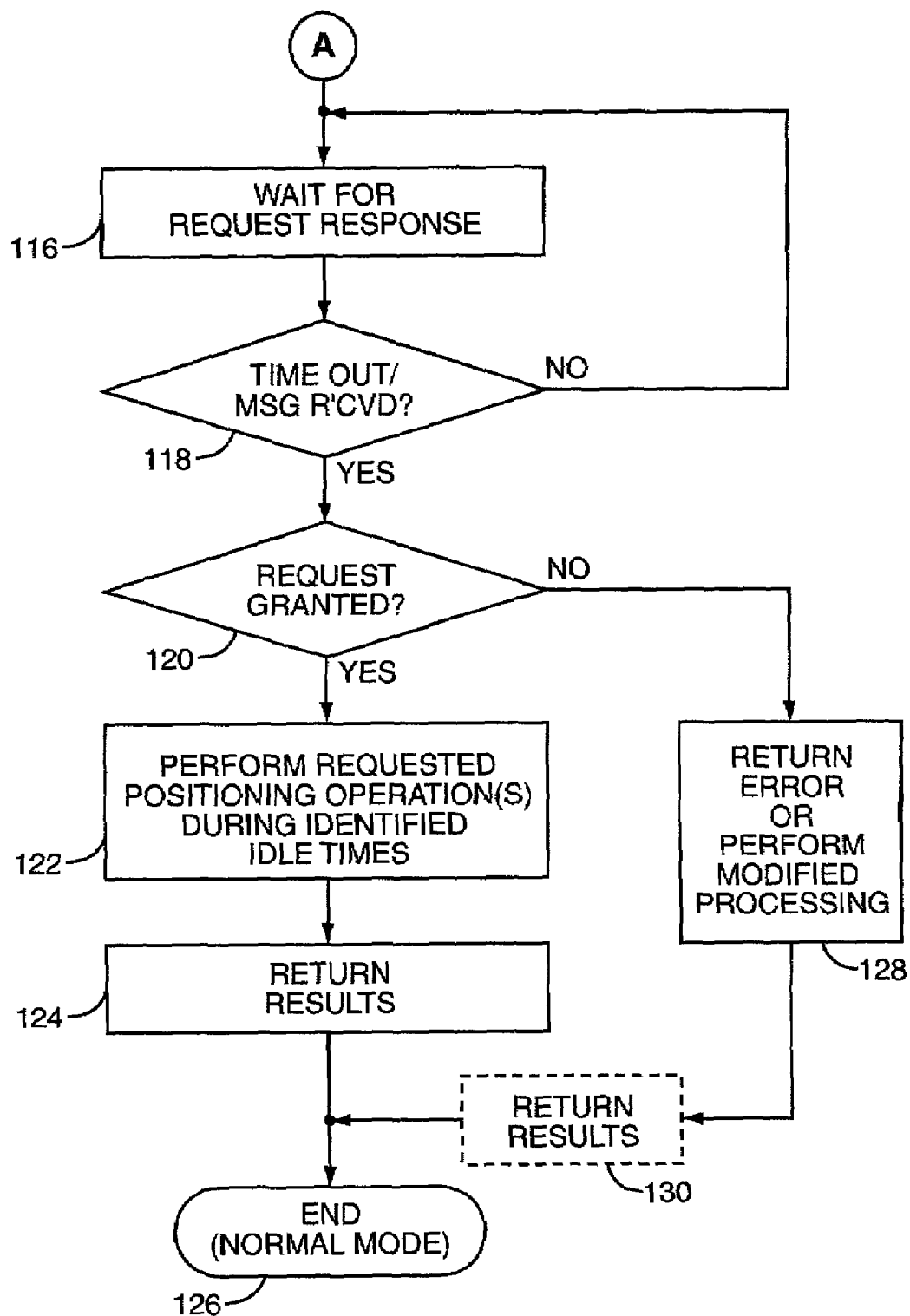

FIGS. 5A and 5B illustrate exemplary operations at the target mobile station 16. Initially, the mobile station 16 operates in a "normal state" with the default amount of idle processing time available (Step 100). At some point, the mobile station 16 receives a positioning request message, requesting the mobile station 16 to perform one or more positioning operations within a stipulated time. For example, the network 10 might ask the mobile station 16 to determine its location to within 100 meters within two seconds. As noted earlier, the mobile station/network might employ different locating technology, such as A-GPS and/or E-OTD. In any case, the request defines the needed positioning function(s) and typically provides the mobile station 16 with time limits for carrying out those functions.

For GPRS applications, the mobile station 16 determines if it is operating in packet transfer mode (Step 104). If not, the mobile station may be in a packet idle mode, or in a voice mode. In either case, the mobile station 16 likely has sufficient background or idle time to perform the needed positioning operation. Such background time is available since voice under GSM generally uses a single RX and TX time slot in each frame, leaving considerable intra-frame processing time between receive and transmit operations.

Thus, if it is not in packet transfer mode, the mobile station 16 simply performs the requested operations (Step 106), returns the results to the network 10 (Step 108), and continues operation in normal mode (Step 110).

However, if the mobile station 16 is in packet transfer mode, it determines whether that mode allows it sufficient background processing time to perform the needed operations within the stipulated time limits (Step 112). For example, packet transfer mode using single RX/TX time slots per frame might allow for positioning processing absent a request for additional time, while multislot class operation may require a request for additional time. If the mobile station 16 determines that its current operating mode requires it to request additional idle time, it formulates that request and transmits it to the network 10 (Step 114).

Turning now to FIG. 5B, and moving from Point "A" in the flow of FIG. 5A, the mobile station 16 waits for a response to its request for additional idle time (Step 116). It waits within prescribed time limits, or timely receives a response message, and then the mobile station 16 breaks from the waiting loop (Step 118). At this point, the mobile station 16 determines whether the request was granted, and, if so, whether the granted additional idle time is sufficient for its needs (Step 120). Ordinarily, the network 10 meets the mobile station's idle time needs if it grants the request at all, but there might still be instances where it is beneficial for the mobile station 16 to verify that the additional idle time allocated by the network 10 actually meets its processing needs.

In any case, if the request is granted and sufficient additional idle time has been granted, the mobile station 16 performs the needed positioning operations using the allocated time (Step 122). Note that the mobile station 16 might formulate the request for additional idle time based on the difference between currently available idle time and the needed amount, in which case it should be understood that the mobile station 16 might use the default idle time that would have existed absent its explicit request plus the newly granted additional idle time. Further, note that the response from the network 10 generally identifies the specific frames within one or more of the upcoming 52-multiframes that are newly designated as idle frames for use by the mobile station 16. By maintaining synchronization with the time slot/frame timing of the network 10, the mobile station 16 synchronizes its positioning operations to coincide precisely with the allocated times. This mobile-to-network synchronization is an explicit requirement in GSM/GPRS, as it is in most other types of communication networks, and is well understood by those skilled in the art.

Upon completion of the requested positioning operations, the mobile station 16 returns the results to the network 10 (Step 124), and returns to the normal state (Step 126). Returning to the normal state here implies a return to the default allocation of idle time.

If the request was not granted, or if the request granted insufficient additional idle time (Step 120), the mobile station 16 may generate appropriate error information or respond in modified fashion (Step 128). For example, if the mobile station 16 is not granted sufficient time to comply with the request, it may return an error message, or perform abbreviated processing and return a less accurate or less complete result, or may perform full processing but return the result at a time later than specified by the request (Step 130). As noted earlier, this error message might be formed as an RRLP error message in the context of GPRS networks.

Figure 6:
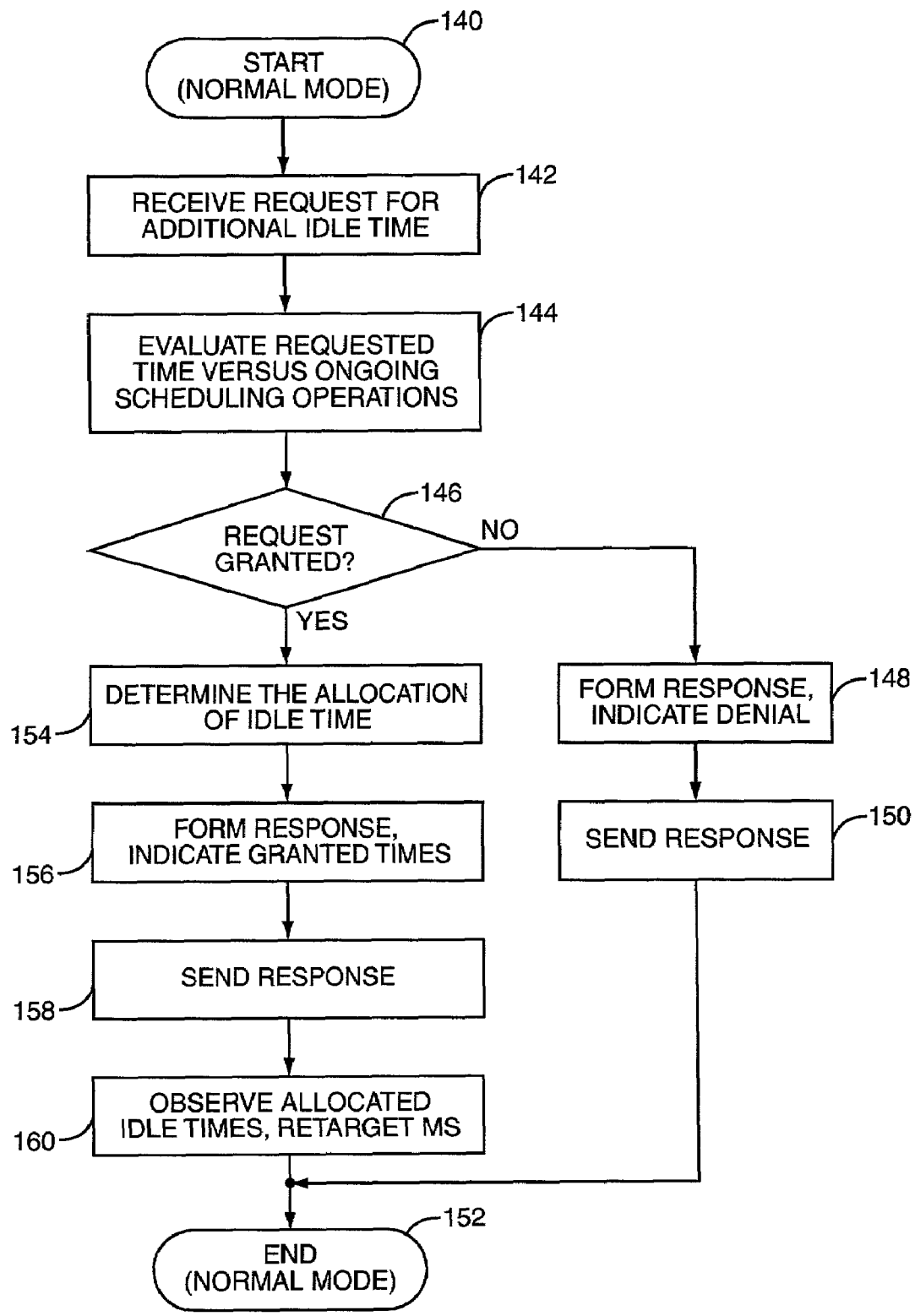
FIG. 6 is an exemplary logic flow diagram illustrating the network receipt of and the response to a request for additional idle processing time from a mobile station.

While FIGS. 5A and 5B illustrate exemplary mobile station operations, FIG. 6 illustrates exemplary, corresponding network operations. Processing begins with the network 10 operating with the default or normal amount of idle time (Step 140). At some point, the network 10 receives a request for additional idle time from the target mobile 16 (Step 142). This request generally comes in response to the network 10 transmitting a positioning request to the target mobile station 16.

Upon receiving the request for additional idle time, the network 10 evaluates the request to determine whether and how the request can be granted (Step 144). As those skilled in the art will appreciate, the ongoing scheduling of communication services for the large number of users typically supported the BSS 20 requires relatively sophisticated scheduling algorithms that determine which user or users are served at any given time, and further determine the optimum or best order of service over the forthcoming service intervals.

In general, user scheduling requires the BSS 20 to make repeated sets of potentially complex calculations representing the relative advantages and disadvantages of serving one user to the exclusion of the others at succeeding points in time. While a detailed treatment of scheduling algorithms is not needed to understand the present invention, exemplary embodiments of the present invention generally include consideration of user scheduling priorities when determining whether to grant request for additional idle time.

If the network 10 denies the request (Step 146), it forms its request response message to indicate such denial (Step 148). Network 10 then sends this response to the requesting mobile station 16 (Step 150), and continues with normal operations (Step 152). However, if the request is granted, the network 10 determines the specific allocation of idle time in one or more forthcoming windows of time (Step 154). For example, in the context of GPRS, the network 10 determines which radio blocks in which forthcoming 52-multiframes will be newly designated as idle blocks as regards the requesting mobile station 16. For example, the mobile station 16 might request sixteen idle frames within a defined window of time, and the network 10 determines whether to designate all twelve radio blocks in a forthcoming 52-multiframe and a remaining four blocks in a succeeding 52-multiframe as idle blocks for the mobile station 16. Alternatively, the network 10 might adopt some other distribution scheme for the needed idle blocks over some number of forthcoming 52-multiframes.

In fact, preserving some radio blocks within a given 52-multiframe as active communication blocks offers some advantages. For example, by not setting aside an entire 52-multiframe as idle time, the network preserves ongoing communication with the requesting mobile station 16, rather than completely disrupting communication during one or more 52-multiframes. Thus, the mobile station 16 requests a certain amount of idle time, specified in terms of frames, blocks, or using some other agreed-upon time indicator, and the network 10 determines how to allocate the needed time. Since the network 10 generally knows the stipulated time limit in which the mobile station 16 is expected to complete the needed positioning operation, it generally knows the extent to which it can distribute additional idle time into future 52-multiframes.

Regardless of the particular approach taken, if the network 10 grants the request, it forms its response message to include indications of the grant, and the particular designation or allocation of idle time to be used by the mobile station 16 (Step 156). The network 10 then sends this response message to the mobile station 16 (Step 158), and takes measures to observe the allocated idle times. Specifically, this means that network 10 does not schedule communication activities (RX or TX) for the mobile station 16 during the times it has identified as additional idle time (Step 160).

Once the period over which the allocated additional idle time spans has passed, the network 10 automatically returns to the default idle time structure consistent with the mobile station's operating mode. This approach minimizes the processing and messaging overhead between requesting mobile stations 16 and the network 10. That is, by having the network 10 automatically resume normal idle time allocations, there is no need to explicitly signal or request the end to additional idle time allocations.

Figure 7:
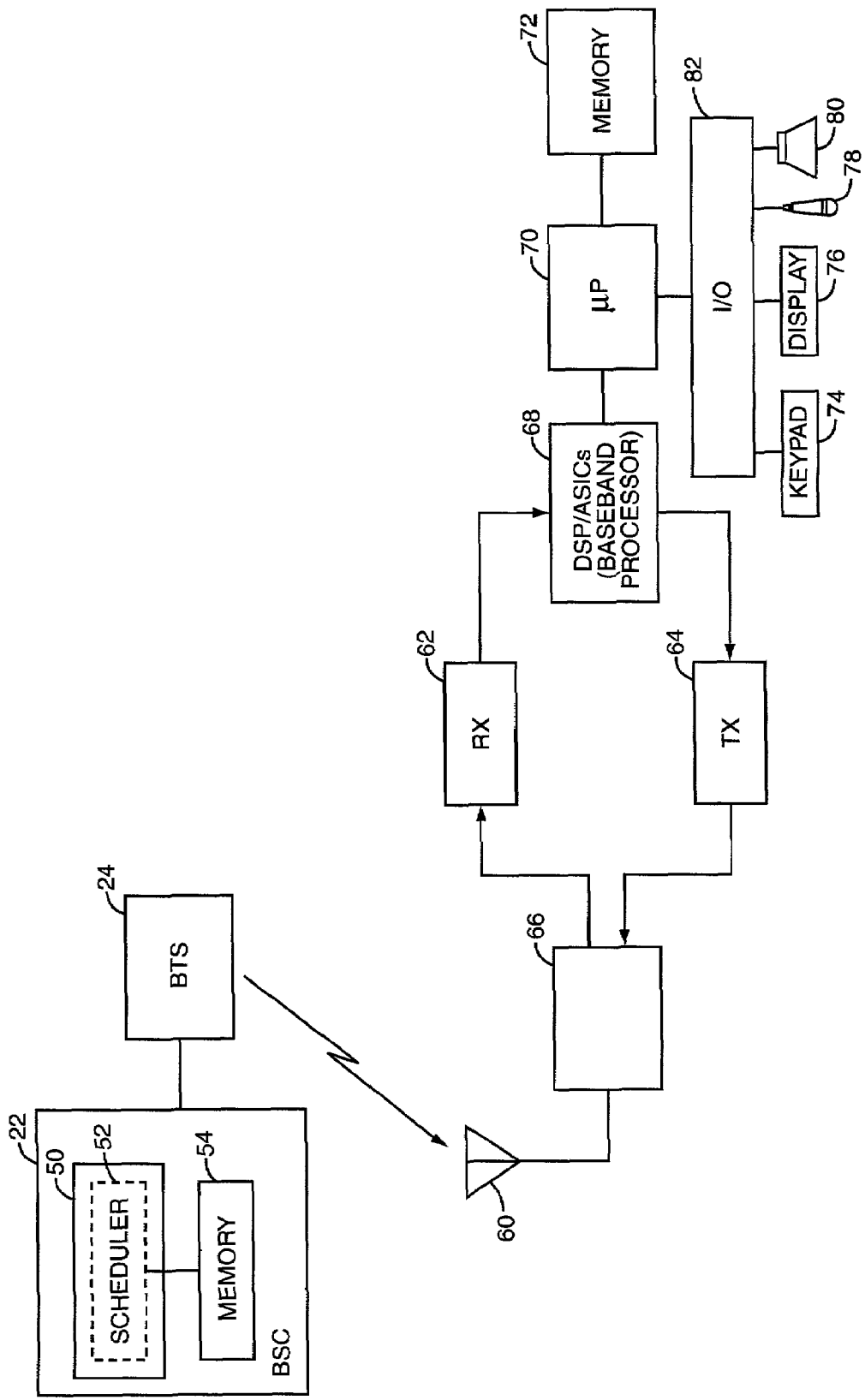
FIG. 7 is a diagram of an exemplary mobile station and network.

While the above mobile/network logic is subject to much variation, it represents an exemplary approach to implementing at least some of the ideas of the present invention. Likewise, FIG. 7 illustrates exemplary network and mobile station details for supporting the above exemplary approach that are themselves subject to much variation. In FIG. 7, the BSC 22 comprises a processing system or systems 50, including a scheduler algorithm 52, and associated with supporting memory 54. Here, memory 54 is understood to potentially include dynamic and static program memory, as well as non-volatile memory, including, but not limited to, FLASH, disk or tape.

In an exemplary approach, the algorithm 52 looks at current scheduling operations involving those users (i.e., mobile stations 16) supported by BTS 24, and bases its granting or denying of incoming requests for additional idle time based on its ability to integrate those requests with ongoing scheduling operations. In general, scheduling algorithm 52 represents just one of many applications or program subprocesses running on processing system 50.

The exemplary mobile station 16 comprises an antenna 60 coupled to a receiver 62 and to a transmitter 64 through a switch 66. Note that the switch 66 might further include duplexer-type filters or other filtering circuits for isolating RX and TX signals during certain modes of operation. Regardless, the exemplary mobile station 16 further comprises a baseband processor 68, a system processor 70 and associated memory 72, along with a keyboard 74, a display 76, a microphone 78, and a speaker 80, which collectively interface to the system processor 70 via input/output (I/O) circuits 82.

The baseband processor 68 might comprise one or more digital signal processors (DSPs), custom circuits such as Application Specific Integrated Circuits (ASICs) or Field Programmable Gate Arrays (FPGAs), or some combination thereof. In any case, the baseband processor 68 generally plays a primary role in supporting communication operations, such as by providing signal demodulation and decoding on the receive side, as well as signal encoding and transmission modulation on the transmit side. Baseband processor 68 may or may not include program logic to implement the present invention as illustrated in FIGS. 5A and 5B, for example. If not, that functionality might be supported in the system processor 70, in which case the required functionality might be implemented as stored program logic in memory 72.

In that scenario, the baseband processor 68 signals the system processor 70 regarding the positioning request, allowing the system processor 70 to determine whether or not a request for additional idle time should be transmitted to the network 10. Thus, the system processor 70 might form a request message, which it then relays to the baseband processor 68 for the appropriate encoding and modulation operations, after which it is transmitted via modulated RF carrier to the network 10.

One aspect not discussed yet concerns the use of so called Uplink State Flags (USFs), which finds use in GPRS systems, and may have equivalent indicators in other types of networks. These USFs are sent by the network 10 to mobile stations 16 in the downlink blocks, and are used for dynamic and extended dynamic allocation of uplink data transfer. (Note that fixed uplink transfer allocations are unaffected.) The USFs tell the respective mobile stations 16 whether they are, on an individual basis, scheduled to send uplink data on the next TX radio block, or, in some cases, the next four radio blocks, in TX 52-multiframes from the mobile stations 16. Thus, when the network 10 indicates to a targeted mobile station 16 that selected RX radio blocks are free for use as additional idle time, it also implies that the network 10 will avoid using these identified blocks for updating USF information to that mobile station 16. In other words, the network 10 must not try to use the downlink blocks identified as additional idle time for the mobile station 16 to send USF information to the mobile station, or, in general, for any other purpose that requires mobile station activity.

Finally, it should be understood that the above details are exemplary, and do not serve to limit the scope of the present invention. Indeed, the present invention is applicable to any wireless communication system where the network and mobile stations may cooperate to selectively and temporarily allocate additional idle processing time to selected mobile stations in furtherance of task processing at those mobile stations. With the techniques of the present invention, the network may grant or deny such requests based on the flexibility of ongoing user scheduling operations, and, if granted, may identify the forthcoming time or times newly designated as idle periods for the requesting mobile station. This allows the requesting mobile stations to continue operations in their current mode, while still being granted sufficient time to meet other task processing requirements.

What is claimed is:

1. A method of facilitating mobile station operations in a wireless communication network, the method comprising:
    receiving a request at the mobile station to perform a designated task;
    determining whether a current operating mode of the mobile station offers sufficient idle time to perform the designated task within a desired time by determining whether available background processing time is sufficient to complete the designated task before expiration of the desired time, the available background processing time being a cumulative time comprising intervals between ongoing transmit and receive operations in combination with currently designated communication idle times; and
    requesting additional idle time from the wireless communication network if sufficient idle time is not available at the mobile station.

2. The method of claim 1, wherein the designated task comprises a positioning operation associated with locating the mobile station, and wherein the request identifies the positioning operation and identifies the desired time for performing the positioning operation.

3. The method of claim 1, further comprising determining the desired time from information included in the request received at the mobile station.

4. The method of claim 1, further comprising performing the designated task using the available background processing time where the available background processing time is sufficient to complete the designated task within the desired time.

5. The method of claim 1, wherein determining whether available background processing time is sufficient for completing the designated task within the desired time comprises at least in part evaluating a number of currently allocated idle time per TDMA multiframe.

6. The method of claim 1, further comprising receiving a response message from the wireless communication network, wherein the response message indicates whether the request from the mobile station for additional idle time is granted.

7. The method of claim 6, wherein, if additional idle time is granted, the response message further indicates one or more future idle times, and further comprising performing at least a portion of the designated task during the one or more future idle times.

8. The method of claim 7, wherein the one or more future idle times are identified time blocks within repeating time-division-multiple-access (TDMA) frames, and further comprising performing the designated task during the identified time blocks.

9. The method of claim 1, further comprising performing the designated task during available idle times, and without requesting additional idle time, if the current operating mode offers sufficient idle time to perform the designated task within the desired time.

10. The method of claim 1, wherein the mobile station comprises a GPRS terminal and the wireless communication network comprises a GPRS network, and further wherein receiving a request at the mobile station to perform a designated task comprises receiving a location services request message defining a desired positioning operation to be performed by the mobile station.

11. The method of claim 1, wherein the mobile station and the wireless communication network communicate using repeating TDMA frames, and wherein requesting additional idle time from the wireless communication network if sufficient idle time is not available at the mobile station comprises requesting additional units of idle time in forthcoming ones of the repeating TDMA frames.

12. A method of facilitating mobile station operations in a wireless communication network, the method comprising:
    sending a command to a GPRS terminal to perform a designated task;
    receiving, at a GPRS network, an idle time request from the GPRS terminal for one or more units of idle time within one or more forthcoming TDMA frames used for communication between the GPRS terminal and the GPRS network, wherein the TDMA frames comprise repeating multiframes, each multiframe comprising a number of communication frames and a default number of idle frames;
    determining whether to grant the idle time request; and
    sending a response to the GPRS terminal identifying one or more selected radio blocks in one or more forthcoming 52-multiframes on a packet data channel (PDCH) to be used as additional idle time by the GPRS terminal for performing the designated task if the idle time request is granted.

13. The method of claim 12, further comprising sending a response to the mobile station indicating a request refusal if the idle time request is not granted.

14. The method of claim 12, wherein determining whether to grant the idle time request comprises determining whether an acceptable distribution of additional idle time over one or more forthcoming TDMA frames exists in consideration of ongoing user scheduling involving a plurality of mobile stations, including the GPRS terminal from which the idle time request was received.

15. The method of claim 14, wherein determining whether an acceptable distribution of additional idle time over one more forthcoming TDMA frames exists comprises determining whether ongoing communication scheduling will permit the GPRS network to allocate the requested amount of additional idle time within a desired time limit.

16. The method of claim 15, wherein the GPRS network receives an indication of the desired time limit as part of the idle time request message.

17. The method of claim 16, wherein the GPRS network knows a priori the desired time limit.

18. The method of claim 12, wherein sending a command to a GPRS terminal to perform a designated task comprises:
    determining that the GPRS terminal is required to perform the designated task;
    identifying a desired time limit for performance of the task; and
    forming the command such that the command indicates the designated task and the desired time limit.

19. The method of claim 12, further comprising:
    receiving a location request from a third party at the GPRS network for the GPRS terminal;
    determining a required location accuracy and a required response time for the location request;
    transmitting a location command to the GPRS terminal from the GPRS network as the command to perform the designated task; and
    receiving the idle time request at the GPRS network from the GPRS terminal responsive to transmitting the location command.

* * * * *